US009201957B2

(12) United States Patent
Turdakov et al.

(10) Patent No.: US 9,201,957 B2
(45) Date of Patent: Dec. 1, 2015

(54) METHOD TO BUILD A DOCUMENT SEMANTIC MODEL

(71) Applicant: The Institute for System Programming of the Russian Academy of Sciences, Moscow (RU)

(72) Inventors: Denis Yurievich Turdakov, Moscow (RU); Yaroslav Rostislavovich Nedumov, Moscow (RU); Andrey Anatolyevich Sysoev, Moscow (RU)

(73) Assignee: The Institute for System Programming of the Russian Academy of Sciences, Moscow (RU)

( * ) Notice: Subject to any disclaimer, the term of this patent is extended or adjusted under 35 U.S.C. 154(b) by 8 days.

(21) Appl. No.: 13/689,659

(22) Filed: Nov. 29, 2012

(65) Prior Publication Data

US 2013/0138696 A1    May 30, 2013

(30) Foreign Application Priority Data

Nov. 30, 2011    (RU) ................................ 2011148742

(51) Int. Cl.
*G06F 7/00*    (2006.01)
*G06F 17/30*    (2006.01)

(52) U.S. Cl.
CPC .............................. *G06F 17/30734* (2013.01)

(58) Field of Classification Search
USPC .......................................................... 707/794
See application file for complete search history.

(56) References Cited

U.S. PATENT DOCUMENTS

| 8,306,356 | B1* | 11/2012 | Bever et al. | 382/275 |
| 2003/0217335 | A1* | 11/2003 | Chung et al. | 715/514 |
| 2009/0083231 | A1* | 3/2009 | Eberholst et al. | 707/3 |
| 2010/0145678 | A1 | 6/2010 | Csomai et al. | |

OTHER PUBLICATIONS

Melli et al., "Supervised Identification and Linking of Concept Mentions to a Domain-Specific Ontology," CIKM '10, Oct. 26-30, 2010, pp. 1717-1720, Toronto, Ontario, Canada.
Mihalcea, et al., "Wikify! Linking Documents to Encyclopedic Knowledge," CIKM '07, Nov. 6-8, 2007, pp. 233-241, Lisboa, Portugal.
Milne, et al., "Learning to Link with Wikipedia," CIKM '08, Oct. 26-30, 2008, 10 pages, Napa Valley, California, USA.
Rusu, et al., "Automatically Annotating Text with Linked Open Data," LDOW '11, Mar. 29, 2011, 5 pages, Hyderabad, India.
(Continued)

*Primary Examiner* — Alex Gofman
*Assistant Examiner* — Muluemebet Gurmu
(74) *Attorney, Agent, or Firm* — Patentbar International, P.C.

(57) ABSTRACT

The invention relates to processing of data during semantic analysis of text data and building of document semantic models. The method consists of two main steps. In step one, an ontology is extracted from external information sources that contain descriptions of particular domain objects. In step two, the text information in the document is linked to ontology concepts and a document semantic model is built. Electronic resources that may or may not be connected through a hyperlink structure are used as information sources. The technical result is achieved, in particular, by identifying all terms in the document and linking them to ontology concepts, so that each term correlates to one concept (its meaning), and then ranking term meanings by importance to the document.

13 Claims, 6 Drawing Sheets

(56) References Cited

OTHER PUBLICATIONS

Salton, Gerard, Dynamic information and library processing, Prentice Hall, 1975, 4 pages.

Turdakov, Denis Yuryevich, "Methods and Programming Means for Word Sense Disambiguation Based on Document Networks," Thesis, 2010, Moscow, 9 pages.

* cited by examiner

Table 1. Values of semantic similarity between concepts

|  | Asteroid belt | Orbit (physics) | Mars (planet) | Mars (mythology) | Jupiter (planet) | Jupiter (mythology) | Object (astronomical) |
|---|---|---|---|---|---|---|---|
| Asteroid belt | 1 | 0.3636 | 0.4 | 0,2222 | 0,3636 | 0,2222 | 0 |
| Orbit (physics) | 0.3636 | 1 | 0.5333 | 0.1429 | 0.625 | 0.1429 | 0 |
| Mars (planet) | 0.4 | 0.5333 | 1 |  | 0.4 | 0 | 0.2222 |
| Mars (mythology) | 0.2222 | 0.1429 |  | 1 | 0 | 0.5 | 0 |
| Jupiter (planet) | 0.3636 | 0.625 | 0.4 | 0 | 1 |  | 0.2 |
| Jupiter (mythology) | 0.2222 | 0.1429 | 0 | 0.5 |  | 1 | 0 |
| Object (astronomical) | 0 | 0 | 0.2222 | 0 | 0.2 | 0 | 1 |

Fig. 5

Table 2. Informativeness of textual representations

| Asteroid belt | 0.3663 |
|---|---|
| Orbit | 0.0488 |
| Mars | 0.0586 |
| Jupiter | 0.2589 |
| Place | 0.0002 |
| Set | 0.0013 |
| Object | 0.0100 |

Fig. 6

METHOD TO BUILD A DOCUMENT SEMANTIC MODEL

RELATED APPLICATIONS

This application claims priority to Russian Patent Application No. 2011148742, filed Nov. 30, 2011, which is incorporated herein by reference in its entirety.

FIELD OF THE INVENTION

The invention relates to processing of data during semantic analysis of text data and building of document semantic models.

BACKGROUND OF THE INVENTION

The amount of information that humans have to analyze is growing by the day. This leads to a need for enriching of documents with metadata to help improve perception of core information and increase perceptual speed. The problem is felt as being especially acute when analyzing text documents. The invention provides solutions to a broad class of problems relating to this field. Some of these problems are listed below.

The proposed invention provides a means of identifying and highlighting key terms in text. This helps achieve higher reading rates and improved comprehension. When reading large text documents or collections of these, it is enough for the reader to look at the keywords, in order to grasp the main content of the text and decide whether there is a need for a more detailed study.

In addition to that, with the help of the invention, electronic texts can be enriched with hyperlinks to external electronic documents that more completely explain the meanings of specific terms. This is necessary when reviewing subject-specific texts containing a large number of terms unfamiliar to the reader. For instance, the sentence, "Piano tuning consists in mutually harmonizing the sounds of the chromatic scale through fourth and fifth interval tempering on a family of stringed keyboard musical instruments", may be incomprehensible to a person unfamiliar with the subject field. An additional description of term meanings helps comprehend the message of the original text.

Furthermore, the invention provides a means of assisting the reader with literary texts written in a foreign language. The invention can be used for creating software tools that can offer more complete information on the key concepts of a foreign text including descriptions in the reader's native language.

The proposed method of identifying key concepts and selecting ones with a similar meaning can be applied to information retrieval. A key issue of contemporary information retrieval systems like Yandex is a lack of an immediate possibility to search for documents that contain only predetermined senses of a polysemantic query. For instance, due to polysemy, the search query "platform" will return documents from different subject fields, with possible senses being: "political platform", "computer platform", "railroad platform", etc. As a workaround, the user has to narrow down the query by entering additional context into the search field.

SUMMARY OF THE INVENTION

The proposed invention provides a means of solving the problem by giving the user a possibility to select a sense or concept to search for. Information retrieval systems that support processing of term senses belong to the field of semantic search. The proposed method can serve as a basis for new semantic search systems. These systems will rank documents by semantic similarity between the senses of the query terms and the senses of the terms in documents. To do this, the system will automatically identify the term sense in a specified context. The invention also provides a means of searching multi-language collections of documents.

Besides that, the invention can be used as a basis for new recommender systems. These systems could be able to find and recommend documents containing keywords that are semantically similar to keywords in a current document. The user could be offered a powerful tool for exploring collections of documents by navigating it using hyperlinks to recommended documents.

A recommendation process for similar collections of documents is possible as well. This usage scenario is similar to the previous one, a difference being that recommendations are made between collections of documents or a document and a collection. In that case, a collection is described using the senses of keywords in constituent documents.

Another field where the invention can be utilized is creation of brief descriptions of documents or document collections, also known as automatic summarization. The proposed method can be used for creating summaries of documents or document collections. These summaries can help the reader quickly identify the specific field of knowledge where documents belong. Summary may consist of the document's key concepts, and/or sentences containing key or related concepts. Summaries can thus be composed of parts of the original text (or collection of texts). Alternatively, they can be separate complete documents that briefly describe the substance of the sources.

The proposed method can be applied to problems of information extraction. Thus, the proposed method can be used for creating a system able to automatically enrich knowledge bases with concepts and links between those. To expand the knowledge base with new concepts, it is necessary to link them to those already existing in the knowledge base. The proposed method provides a means of easily linking a new concept to those in the knowledge base through analysis of the new concept's description. This application is described in greater detail below.

The invention can be applied in other fields related to analysis of natural language, such as extraction of information from documents, machine translation, discourse analysis, sentiment analysis, and creation of dialog and question answering systems.

Note that the proposed method is applicable both to text documents and collections of documents, as well as to multimedia objects containing text metadata. For instance, music tracks may contain the text title, the performer, the composer, etc in metadata. As well, video files may contain the text title, the type, the names of the director and actors (for films), etc. Thus, the invention can be applied to various types of electronic documents containing text information, to solve a broad class of problems in the field of natural language processing, information retrieval, and information extraction.

The closest ideas to the proposed method were expressed in papers on systems that highlight keywords in text and link these to Wikipedia articles. The methods described in these papers consist of two steps: first, keywords are identified, then linked to Wikipedia articles.

The best-known projects in this field are Wikify! and David Milne and Ian Witten's work. In Wikify! [Rada Mihalcea and Andras Csomai. 2007. Wikify!: linking documents to encyclopedic knowledge. In Proceedings of the sixteenth ACM conference on Conference on information and knowledge management (CIKM '07). ACM, New York, N.Y., USA, 233-242], the authors identify key terms, linking these to Wikipedia's dictionary, and use a combination of predetermined rules and machine learning algorithms to identify the correct sense. Only features that ignore text semantics are used, as key term search is performed prior to identifying the terms' senses. This limits the accuracy of the algorithms.

Milne and Witten, in their paper [David Milne and Ian H. Witten. 2008. Learning to link with Wikipedia. In Proceeding of the 17th ACM conference on Information and knowledge management (CIKM '08). ACM, New York, N.Y., USA, 509-518], improved the results by proposing more complex classification algorithms to identify key terms and their senses. As in the preceding paper, Wikipedia was used as the training corpus for the algorithms. However, similar to Wikify!, the system used only features that ignore text semantics to identify key terms, which limits the accuracy of the algorithms.

The patent application [Andras Csomai, Rada Mihalcea. Method, System and Apparatus for Automatic Keyword Extraction. US patent 2010/0145678 A1.], filed by the authors of Wikify!, describes a method to identify keywords. The patent utilizes ideas similar to those expressed in the paper [Rada Mihalcea and Andras Csomai. 2007. Wikify!: linking documents to encyclopedic knowledge. In Proceedings of the sixteenth ACM conference on Conference on information and knowledge management (CIKM '07). ACM, New York, N.Y., USA, 233-242]. The authors identify features to be used for extracting keywords from the text with the help of a combination of algorithms. The method described above is proposed for use in book indexing. That patent has the shortcomings of the systems described above, i.e. the process of identifying key terms relies only on features that ignore text semantics, and is directed at a narrow range of problems.

Besides, the recent past has seen the appearance of papers that provide solutions to a similar problem of extracting key terms and linking these to external content. However these solutions rely on websites containing linked open data, rather than Wikipedia [Gabor Melfi and Martin Ester. 2010. Supervised identification and linking of concept mentions to a domain-specific ontology. In Proceedings of the 19th ACM international conference on Information and knowledge management (CIKM '10). ACM, New York, N.Y., USA, 1717-1720. Delia Rusu, Blaz Fortuna, and Dunja Mladenic. Automatically annotating text with linked open data. In Christian Bizer, Tom Heath, Tim Berners-Lee, and Michael Hausenblas, editors, 4th Linked Data on the Web Workshop (LDOW 2011), 20th World Wide Web Conference (WWW 2011), Hyderabad, India, 2011]. These papers propose methods to build domain-specific ontologies using special websites. Unlike papers that rely on Wikipedia, ontologies obtained this way are small in size, so more resource-intensive algorithms can be used for text processing. Due to the small size of the ontologies used, these papers only solved the problem of identifying term senses, without solving the problem of key term search.

The technical problem addressed by the invention was to devise a method to build a document semantic model, which could be used for enriching documents with supplementary information semantically linked to the main subject(s) of the document(s). The semantic model could be built using ontologies which, in turn, were built using both information sources containing linked open data (e.g. Wikipedia) and any other available sources containing unlinked text descriptions of domain objects, such as company websites, e-books, specialized documents, etc. The term senses in the document would be induced both from the lexical features and from their semantic relationship to the document.

The essence of the invention is to propose a method to build a document semantic model, wherein an ontology is extracted from information sources, such as electronic resources containing descriptions of particular real-world objects—either linked or not containing any hyperlinks. Each concept in the ontology is assigned an identifier that unambiguously identifies it. Hyperlinks, if any, between concept descriptions are transformed into links between concepts. If no hyperlink structure is present, hyperlinks are added by analyzing the descriptions and inducing term senses from ontologies extracted from hypertext encyclopedias. The links are then transformed into links between concepts, and the URL of the original concept description is saved. At least one textual representation is set for each concept. The frequency of co-occurrence and informativeness are computed for each textual representation of the concept. The natural language of the textual representation is identified, and the obtained information is saved. The document to be analyzed is searched for terms and their possible senses by correlating parts of the text with textual representations of concepts from the controlled vocabulary. For each term, one sense is selected from a range of possible senses using a word-sense disambiguation algorithm. This sense is then considered to be the term's meaning. Concepts that correspond to term senses are ranked by importance to the text, and the most important concepts are considered as the semantic model of the document.

The word-sense disambiguation algorithm used is an algorithm that selects the most frequently used sense. This is found by determining the frequency of co-occurrence of the term being processed and all possible related concepts, and selecting the concept with the highest co-occurrence frequency as the term's meaning.

Besides, the word-sense disambiguation algorithm selected can be an algorithm that computes the sequence of senses with the highest semantic similarity. The sequence is found by examining all possible sequences of concept senses for a given term sequence. The weight of each concept sequence is computed as the sum of the weights of unique concept pairs included in the concept sequence. The sequences having the highest weight are considered as the term meanings.

Besides, the word-sense disambiguation algorithm selected can be an algorithm based on supervised machine learning, wherein a feature vector is computed for each term, and the most suitable sense is identified from that vector.

The term's informativeness could be selected as the vector feature.

Besides, the usage probability of term t in given sense $m_i$, computed as $$P_t(m_i) = \frac{c(t, m_i)}{\sum_i c(t, m_i)},$$

where $c(t, m_i)$ is the frequency of co-occurrence of term t in sense $m_i$, can be used as the vector feature.

Besides, semantic similarity between the concept and the document context can be used as the vector feature.

The senses of monosemantic terms could be selected as the document context.

Besides, the sum of the informativeness values of each monosemantic term and the semantic similarity of its meaning to all other concepts from the document context could be used as the vector feature.

To determine the link structure of the information source that contains no hyperlinks, an ontology is extracted from a hypertext encyclopedia. The concept descriptions in the information source that contain no hyperlinks are enriched with links to the existing ontology extracted from the hypertext encyclopedia. The controlled vocabulary of the existing ontology is extended with textual representations of all concepts from the information source being processed and containing no hyperlinks. The co-occurrence frequency of those concepts and their textual representations is set to 1 for each unique representation-concept pair. The enriching operation is repeated for concepts in the information source being processed using informativeness computed through inverse document frequency. This produces additional links between the concepts that are extracted from the information source containing no hyperlinks, and the co-occurrence frequency of the textual representation and the concept is updated using the previously obtained links.

A document semantic graph is built, in order to rank concepts by importance to the document. The graph comprises the senses of all terms from the documents and all possible weighted links between these, wherein link weight equals the semantic similarity between the concepts connected by that link. A clustering algorithm is applied to the semantic graph, in order to group the concepts which are semantically similar. Then the concepts from the most important clusters are ranked by importance to the document, and the most important concepts are considered to be the semantic model of the document.

Besides, the semantic similarity between the concepts is computed when extracting the ontology. For each concept K, concept list C is built, composed of concepts $c_i$ referenced by concept K or referencing concept K. The semantic similarity of current concept K to each concept $c_i \in C$ is computed. The semantic similarity between each pair of concepts K and $c_i$, along with corresponding concepts K and $c_i$ are saved. For concepts not on list C, their semantic similarity to concept K is taken as zero.

Links between the concepts are assigned weights, a weight threshold is set, and concept list C is built from concepts either referenced by concept K with a link exceeding the previously selected threshold value, or referencing concept K with a link exceeding that threshold.

Besides, ontologies can be extracted from several sources.

Furthermore, document metadata are used as the document text.

Thus, a solution to the technical problem became possible thanks to the differences of the proposed method from the methods set forth in known papers, the key differences being as follows:

known methods identify key terms and then link these to external data sources. The proposed method provides a reverse order of text processing: first, all terms are extracted and linked to concepts in an ontology extracted from external sources, whereupon the concepts are ranked by importance to the document. This is a more complex approach, as it requires one to determine the meanings of all of the document's terms. However, it also makes it possible to decide whether the term is a key term using conceptual knowledge about the document, not its textual features;

this method implies building a document semantic model which, in particular, provides a means for solving the problem of enriching text with links to external resources;

the proposed method makes it possible to use a much greater number of information sources for building ontologies. Thus, besides Wikipedia and websites containing linked open data, it is proposed to use any available sources containing text descriptions of domain objects which are, in principle, not connected with hyperlinks: company websites, e-books, specialized documentation, etc.

expand the range of problems that can be solved.

BRIEF DESCRIPTION OF THE DRAWINGS

The operation of the invention is explained with materials presented in FIGS. 1-6.

DETAILED DESCRIPTION OF THE PREFERRED EMBODIMENTS

Figure 1:
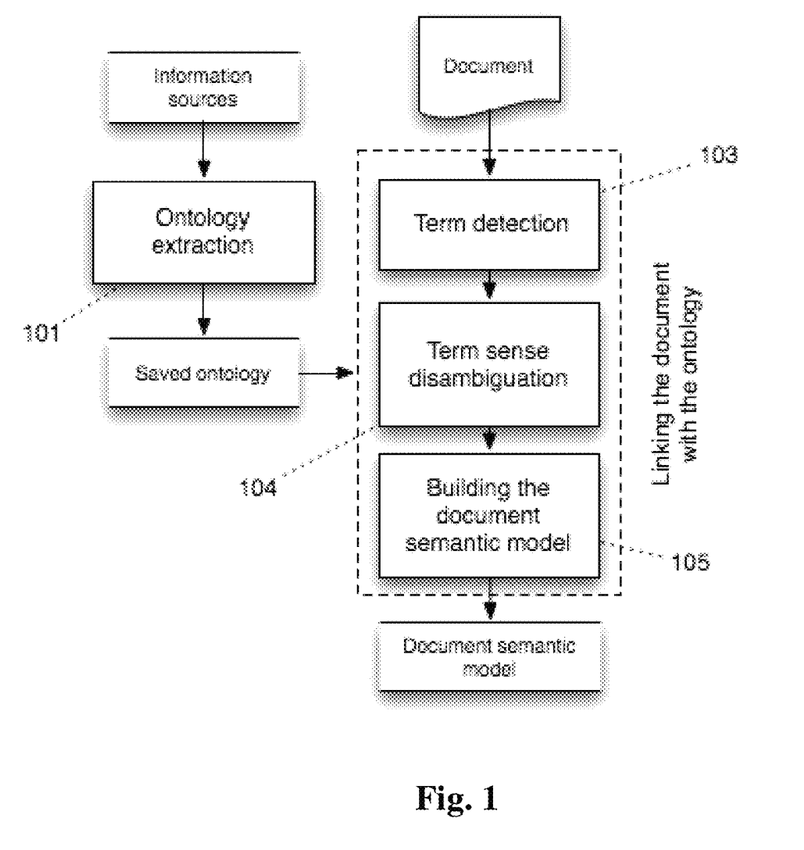
FIG. 1 provides a schematic representation of the process of building a document semantic model.

The operation of the invention consists of two steps schematically represented in FIG. 1. In step one (101), an ontology is extracted from external information resources. In step two (103-105), the text information in the document is linked to ontology concepts and a document semantic model is built.

Consider step one of the proposed method: extracting an ontology from external information sources. The sources can be any information resources that contain descriptions of particular domain objects. The further description of step one details the structure of the ontology used in this invention. Thereafter, we consider a processing of various information sources to extract an ontology with a required structure.

An ontology consists of concepts and links between them. Each concept corresponds to one particular domain object. A link between two concepts signifies only that the concepts are interrelated in some manner. The presence of a more complex semantic link is possible but not required for the proposed method. For instance, in an ontology describing the business of a company that manufactures photographic equipment, concepts can be camera models, technologies (smart autofocus), etc. Camera models can be linked to technologies they use and other models.

Each concept has a certain identifier which unambiguously identifies that concept. This identifier can be: (a) a unique integer correlated to the concept when creating the ontology, (b) the text name of the concept, or (c) any other way of unambiguously identifying the concept within the ontology, e.g. a pointer in programming language terms or a primary key in case a relational model is used.

Each concept has at least one textual representation. A textual representation is one or several words that can be used to identify the concept. Unlike the identifier, this can be ambiguous. The set of all textual representations is a controlled vocabulary that is used when linking documents to an ontology.

If a concept has several textual representations, these representations will be synonymous in relation to one another. For instance, "Russia" and "Russian Federation" are textual representations of the same concept.

Due to peculiarities of natural language, one textual representation can be linked to several concepts. These textual representations are called polysemantic. For instance, the word "platform" can represent the concepts "political platform", "computer platform", "railroad platform", etc.

Linking a document to an ontology requires knowledge of the co-occurrence frequency of the textual representation and the concept within the specified object domain. The frequency is computed when building an ontology as described below.

Also during this stage, informativeness is computed for each textual representation. Informativeness is a numerical measure that reflects the importance of a textual representation to the object domain. See below for methods of computing informativeness.

Besides, representations of one concept can be different in different natural languages. For instance, "кошка" and "cat" represent the same concept in Russian and English, respectively. Thus, an ontology indicates to which natural language the textual representation belongs.

Also, when extracting an ontology, a link to the information resource that contains the original concept description is saved. When creating practical applications of the invention, these links can be provided to the reader of a text that was enriched using the proposed method, e.g. in the form of links to supplementary information on the subject.

Thus, the following information is required for building an ontology:
  concept and its identifier,
  URL of the original concept description,
  links between concepts,
  textual representations of concepts,
  co-occurrence frequency of the textual representation and concept,
  informativeness of the textual representation,
  language of the textual representation (if multi-language information is present).

Consider the process of ontology extraction. The simplest information sources to process are hypertext encyclopedias. The process is well-known and described in [Rada Mihalcea and Andras Csomai. 2007. Wikify!: linking documents to encyclopedic knowledge. In Proceedings of the sixteenth ACM conference on Conference on information and knowledge management (CIKM '07). ACM, New York, N.Y., USA, 233-242.] and [David Milne and Ian H. Witten. 2008. Learning to link with Wikipedia. In Proceeding of the 17th ACM conference on Information and knowledge management (CIKM '08). ACM, New York, N.Y., USA, 509-518]. A hypertext encyclopedia is an aggregation of information that consists of objects and their descriptions. Each object is an encyclopedia article, e.g. "Moscow" or "Pythagorean theorem". Thus, each object in a hypertext encyclopedia becomes an ontology concept. The identifier of a concept can be information that is extracted from an encyclopedia and unambiguously identifies the concept. Alternatively, an identifier can be created by the ontology processing system which will automatically assign one to each concept. For instance, in the Wikipedia open encyclopedia, each article already has a unique identifier which can be used in an ontology extracted from that encyclopedia. When extracting an ontology, a uniform resource locator (URL) that can be used to find the page should be saved as well.

The description of an object can mention other objects in the encyclopedia. In hypertext encyclopedias, these mentions are represented in the form of hyperlinks to descriptions of other objects. Thus, each object can reference other objects, wherein a link signifies interrelatedness between two objects: (i) the referencing object and (ii) the referenced object. These references determine links between concepts. For instance, one can deduce from the description, "Moscow is the [capital|Capital] of the [Russian Federation|Russia]" that the concept "Moscow" is interrelated with "Capital" and "Russia". In this and future examples, hyperlinks are enclosed in square brackets, with two parts divided with a vertical bar: the text visible to the user ("capital", "Russian Federation") and the object referenced by the links ("Capital", "Russia"). The text visible to the user is called a linkcaption.

We will be using the link structure described above to extract textual representations and related frequency characteristics. We will consider the link caption as the textual representation of the concept to which the link points. Thus, in the previous example, "Russian Federation" represents "Russia". In that case, the co-occurrence frequency of the link caption and concept equals the number of links that contain the specified textual representation and concept as its parts. Note that Wikipedia organizes redirect pages, which can be used to provide alternative names for article titles, as a special case of a hyperlink and processes them accordingly.

However not all link captions should be considered as textual representations and added to an ontology. For instance, link captions may contain misspelled words or terms that have little meaning when used on their own and take on importance only when used in context (e.g. the word "this") It is proposed to use an occurrence threshold to filter out these link captions. Those above the threshold will be considered a textual representation. The threshold is selected depending on the resource being processed. Thus, it is recommended to set the threshold equal to 10 or lower for English Wikipedia.

It is common practice in hypertext encyclopedias to use hyperlinks only for concepts important to comprehending the body of the text. Thus the informativeness (degree of importance) of a textual representation can be evaluated as the ratio of the number of articles where the representation occurs as a link, to the number of articles where it occurs in any form. For instance, the informativeness of the term "asteroid belt" as computed using Wikipedia is 0.3663, while the informativeness of the term "Base" is 0.00468, which is significantly lower as this is a polysemantic term, and its meaning is often expected to be known to the reader or unimportant to the description.

Hypertext encyclopedias are normally created in a particular language, so the language of textual representation is the language of the encyclopedia. Note that it is necessary to identify duplicate concepts when building multi-language ontologies. For instance, the Wikipedia article entitled "Россия" has an English counterpart. Hypertext encyclopedias contain interlingual references to counterparts in other languages—a simple way to identify duplicates. There are more complex methods of eliminating duplicates but these belong to the field of machine translation and are not examined in this invention.

Apart from the known method of extracting ontologies from hypertext encyclopedias, this invention proposes a method of extracting ontologies from other information sources, such as websites, databases or electronic documents.

Extraction of an ontology is practicable if separate objects and their descriptions can be extracted from the source. For instance, a website with descriptions of film industry news may contain separate pages or sections describing motion pictures, actor or director profiles, etc.

For these sources, each object becomes an ontology concept. Similar to a hypertext encyclopedia, the concept identifier is determined by available information or set by the source's automatic processing system. Besides, the URL of the description is saved. If the object has no such URL, for instance where one page contains several objects and their descriptions, the most precise possible locator of a more general frame (page URL in the example) is saved.

Extraction of concept textual representations follows the rules below which use source structure. For web pages, textual representations may be contained in the page title or marked with special tags. More complex methods considering structural and textual properties of the document can be used as well. For instance, it is possible to use machine learning algorithms that utilize parts of speech, surrounding context, presence of capital letters, etc. as features [Gabor Melli and Martin Ester. 2010. Supervised identification and linking of concept mentions to a domain-specific ontology. In Proceedings of the 19th ACM international conference on Information and knowledge management (CIKM '10). ACM, New York, N.Y., USA, 1717-1720.].

Links between concepts are determined by analyzing their descriptions. If the descriptions have a well-developed link structure, extraction of remaining information is performed in a manner similar to processing a hypertext encyclopedia.

In case descriptions contain no links, more complex algorithms are necessary for building links between objects. This invention can be used for solving that problem.

First, we determine the informativeness of the textual representation. The informativeness value is required for identification of links between concepts. However, in this case, there is no possibility to use a link structure. That being the case, the importance of a textual representation can be determined using the measure of inverse document frequency of a term that is lexically identical to that representation, known from the field of information search [Gerard Salton. 1979. Dynamic Library Search Systems/Динами ческие библис гчнс поиско вые системы. Mir, Moscow (Gerard Salton. Dynamic information and library processing, Prentice-Hall, 1975)]:

$$\text{informativeness (textual representation)} = idf(\text{term})$$

$$= \log \frac{|D|}{|(d_i \supset t_i)|},$$

where $|D|$ is the number of descriptions being processed, and $|(d_i \supset t_i)|$ is the number of descriptions that mention term $t_i$.

The following steps are required for determining the link structure:

1. extract an ontology from a hypertext encyclopedia, e.g. Wikipedia;
2. enrich the description of the information source being processed with links to the existing ontology;
3. expand the controlled vocabulary of the existing ontology with textual representations of all concepts from the information source being processed;
4. set the co-occurrence frequency of the textual representation and the new concept to 1 for each unique representation-concept pair;
5. repeat the concept enriching operation for the information source being processed. Informativeness computed using inverse document frequency must be used here. This will produce additional links between concepts (see text processing as described below);
6. update the co-occurrence frequency of the textual representation and concept using information from the previously obtained links.

Building of a new ontology requires the use of an ontology extracted from a hypertext encyclopedia due to the polysemy of language terms. This invention provides a means of determining the sense of a term in a specified context. Thus, the use of a known ontology makes it possible to disambiguate terms in the descriptions of new concepts.

Some information sources contain a translation of the information into various languages. The language of the textual representation must be saved for such sources when processing.

The above operations produce one ontology extracted from several information sources. However, certain applications benefit from distinguishing of ontologies built from different information sources. To do this, an extra attribute is added to each concept, pointing to the source of the concept. The attribute is accessed for information on the source when processing documents.

Before proceeding to text processing, we will introduce the concept of semantic similarity between concepts which we will use hereinafter.

We will use the term "semantic similarity" to refer to representation f: $X \times X \rightarrow \mathbb{R}$ that assigns a real number to a pair of concepts x and y, and possesses the following properties:

$0 \le f(x, y) \le 1,$ $f(x, y)=1 \Leftrightarrow x=y.$

Known methods of determining semantic similarity can be divided into two classes:
methods that determine similarity using text fields and
methods that use an ontology link structure.

The first class comprises methods used in information retrieval for comparing text documents. The best-known of these is representation of a document as a vector space model: each word in every document is weighted, the documents are represented as vectors in an n-dimensional space of all possible words, and similarity between the vectors thus obtained is computed using a certain mathematical measure. The weight of a word in a document can be determined as $$\text{weight}=tf*idf$$

where tf is the number of times the word occurs in the document and idf is inverse document frequency as described above. The weight of each word sets the document vector coordinate for the respective dimension. Similarity between vectors is often computed using the cosine measure between them:

$$\cos(d_1, d_2) = \frac{d_1 \cdot d_2}{\|d_1\| \|d_2\|},$$

where $$\|d\| = \sqrt{\sum_{i=1}^{n} d_i^2}$$

Thus similarity between concepts can be determined as similarity between their descriptions.

However, measures from the second category are more widely used. These measures, in turn, can be divided into local and global. Local methods determine similarity between concepts A and B as normalized number of common neighbors N(X):

$$sim(A, b) = \frac{1}{z}|N(A) \cap N(B)|,$$

where Z is the normalization coefficient and $|N(A) \cap N(B)|$ is the intersection between the sets of immediate neighbors A and B.

The best-known local methods are
cosine measure:

$$Z = \sqrt{\sum_{i=1}^{n} A_i^2} \sqrt{\sum_{j=1}^{n} B_j^2}$$

Dice's coefficient:

$$Z = \frac{|N(A)| + |N(B)|}{2}$$

Jaccard index: $Z=|N(A) \cup N(B)|$(union of sets of immediate neighbors).

To ensure that these measures satisfy the second property of our semantic similarity definition, we consider each ontology concept as containing a link to itself. Then the similarity between the concepts without links to other concepts equals 1 only when the concepts match and 0 in any other cases Note that the aforementioned measures are determined for sets and cannot consider link semantics. In order to eliminate that shortcoming, Denis Turdakov's thesis proposed weighing links of various types and generalizing similarity measures to weighed links using fuzzy set theory [Denis Yuryevich Turdakov. Methods and Programming Means for WordSense Disambiguation Based on Document Networks. Thesis. 2010. Moscow].

The best-known global method is the SimRank measure. The model's main premise can be worded as follows: "two objects are similar if referenced by similar objects." Since that premise defines similarity through itself, the basic premise of the SimRank model is the statement, "any object is considered maximally similar to itself", i.e. having a similarity score of 1 to itself.

Note that global methods have higher computational complexity and are applicable to small ontologies only. Therefore it is recommended to use local methods for the proposed method.

Besides the aforementioned definition of semantic similarity, this invention proposes generalization for computing of semantic similarity between concept sets. To this end, sets are represented as a generalized concept linked to the neighbors of all constituent concepts:

$$N(c_1, c_2, \ldots, c_N) = \cup_{i=1}^{N} N(c_i)$$

that is, the set of the neighbors of the generalized concept is a union of sets of all immediate neighbors of the concepts that constitute the generalized concept.

Figure 2:
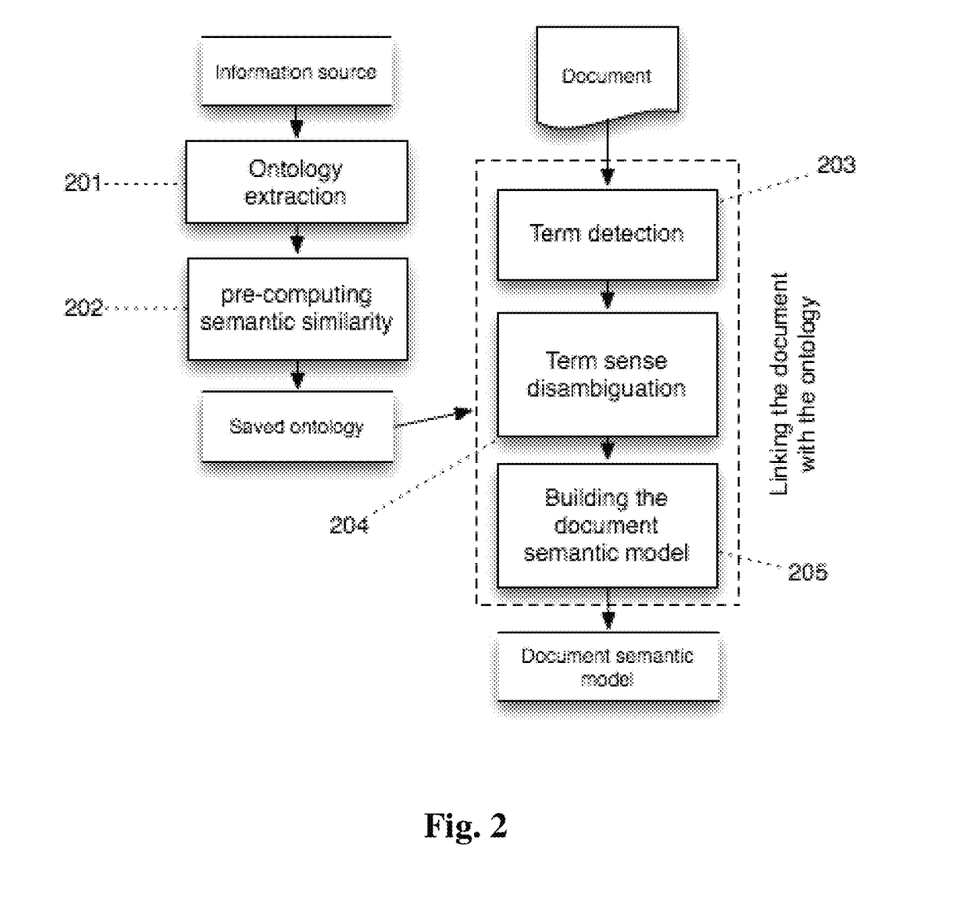
FIG. 2 provides a schematic representation of the process of building a document semantic model preceded by a computation of semantic similarity.

Computation of semantic similarity is a frequent operation when processing text. Therefore, this invention proposes taking an additional (optional) step when building an ontology, to compute similarity between concepts in advance (FIG. 2. 202). However, for a fairly large ontology, for instance, one extracted from Wikipedia, computing semantic similarity between concepts in advance is not realistic. Wikipedia contains descriptions of 3.5 million strongly linked concepts. This means that the data would occupy several terabytes of space and the computing work, considering the current level of processing capacity, would take several machine years. Hence this invention proposes a number of heuristics that make it possible to perform a preliminary computation for a subset of terms and use only those values when processing text.

For an ontology that does not store link types, it is proposed to compute semantic similarity only for concepts with a direct link.

For ontologies that store link semantics, it is proposed to assign link weights depending on their type and to compute semantic similarity only for links whose weight is above a certain threshold. The threshold and link weights are chosen in such a manner as to find a compromise between the number of semantic similarity values for preliminary computation and the quality of term meaning determination.

These heuristics provide a means of determining semantic similarity in advance without substantially compromising quality when processing text.

A preliminary computation of semantic similarity is done for all concept pairs that are connected by a link determinable using the above heuristics. Preliminary computation of semantic similarity is performed as follows:

For each concept K
obtain the list of neighbor concepts C referenced by concept K or referencing concept K,
compute the semantic similarity of current concept K to all neighbor concepts $c_i \in C$,
for each concept $c_i$ in C, save the previously computed semantic similarity between the pair of concepts K and $c_i$ and respective concepts K and $c_i$.

If semantic similarity was computed in advance, its values are retrieved from the ontology during text processing. If there was no preliminary computation, similarity is computed on request.

Proceed to step two of the proposed method: linking the document to the ontology. We will use "term" for a word or several consecutive words (phrase) in a text. The purpose of this step is to find an unambiguous correlation between the terms and ontology concepts. We will call these concepts term meanings. Thus, the purpose can be reformulated as finding terms in the text and determining their meanings.

To find terms in the text and determine their meanings, it is necessary to perform three steps (FIG. 1):

In step one, determine all possible links between the terms and concepts (103).

In step two, disambiguate the terms (104).

In step three, build a semantic model of the document (105).

The term search process (103) consists in comparing text parts and textual representations present in the controlled vocabulary. The simplest and most efficient method is to search for perfectly matching strings. Methods that use partial matches are known as well, but these can be used for small ontologies only, due to significantly higher computational complexity.

We will consider the method that relies on term presence in the controlled vocabulary. As item-by-item examination of all text parts would be inefficient, we provide a number of heuristics that help speed up the process.

1. Since a controlled vocabulary contains only words or word sequences, it is reasonable to split the text down into words and check for presence in the controlled vocabulary only those text parts composed of words.

2. A term cannot exceed sentence boundaries, so a term must be searched within one sentence only.

3. In most cases, textual representations of concepts are noun or noun phrases. Therefore, to speed up processing, it is recommended to detect parts of speech, disregarding combinations that are not noun phrases. This heuristic also helps improve the accuracy of term search by disambiguating morphological polysemy. For instance, the Russian verb form "стекло" ("it flowed down") will not be taken for the noun "стекло" ("glass") and the English verb "cause" will not be considered as the noun "cause".

4. Since words can have various forms, the controlled vocabulary must retain all the possible forms. To reduce memory usage and increase processing speed, it is recommended to use lemmatization algorithms to convert all words back to their original forms, for instance, nouns to singular nominative for Russian and singular for English. For the same purpose, it is reasonable to convert all letters to one case, and eliminate spaces and punctuation marks. In that case, all words in the controlled vocabulary are subject to similar conversion. For instance, the textual representation "asteroid belt" would be converted to "asteroidbelt".

5. For compound terms that include other terms as elements, it is reasonable to consider only the longest of those. For instance, the word "belt" in the term "Asteroid belt" does not need to be considered individually.

After all terms present in the controlled vocabulary are found, concepts that correspond to these as possible term meanings should be considered. The next step is selecting term meaning from all possible concepts. The problem of determining term meanings belongs to the field of word-sense disambiguation. The most significant results in that field draw on the latest advances in machine learning.

Machine learning is a branch of artificial intelligence that studies methods of designing algorithms capable of learning. Machine learning is classified into supervised and unsupervised. In supervised learning, the algorithm generates a function that maps input to output in a certain way (classification problem). Examples of desired links between input and output data are provided as training data. In unsupervised learning, the algorithm acts as an agent that models an input set without access to previously marked examples. Both algorithms use the concept of a feature. Features are individual measurable properties of an observable phenomenon that are used for creating its numerical representation (e.g. semantic similarity between a concept being processed and the meaning of the preceding term).

Consider several existing word sense disambiguation algorithms that can be used in this invention. The simplest way is to select the most frequently used meaning. To do this, we find the co-occurrence frequency of the term being processed and all concepts linked to it. Then the concept with the highest frequency is selected as the meaning. This algorithm always selects the same meaning for a fixed term regardless of the context and thus has fairly low accuracy.

Another approach is the algorithm that computes the sequence of meanings with the closest semantic links. Consider all possible sequences of meanings for a specified sequence of terms. It is necessary to compute the weight of each possible sequence of concepts. The weight of a sequence is computed as the sum of the weights of unique concept pairs that it includes. The concept sequences with the highest weight are the meanings of the terms. A usage example is described below.

The two algorithms described above are extreme cases that ignore important information on the text. Therefore, algorithms based on supervised machine learning exhibit the best results. For each term, a feature vector is computed which the algorithm then uses to select the most suitable meaning. Features can be:

term informativeness, occurrence frequency of term t in given sense $m_i$ computed as $$P_t(m_i) = \frac{c(t, m_i)}{\sum_i c(t, m_i)},$$

where $C(t, m_i)$ is the co-occurrence frequency of the term and the sense.

Semantic similarity between the concept and the context. Previously determined meanings, e.g. the meanings of monosemantic terms, can serve as context.

Context quality, determined as the sum of the informativeness values of each monosemantic term and semantic similarity of its meaning to all other concepts from the context.

and other features.

Text marked by experts can serve as training data for machine learning. However, text marking is a resource-intensive operation; therefore, documents from the ontology source can be used as a training set.

Another important remark is that the ontology does not always contain the meaning of the term. To detect that situation, we add a special concept denoting the absence of the correct meaning in the ontology, to the list of concepts that correspond to each term. Then the machine learning algorithm described above detect these cases. However, this requires a special training set that contains examples for such cases. This type of corpus can be used to train an algorithm that can detect the presence of a term meaning in an ontology. This algorithm can also be combined with simple algorithms for determining meanings as described above. Filtering the terms whose informativeness is below a certain threshold is a special case of that algorithm. The latter approach is described in the thematic papers [Rada Mihalcea and Andras Csomai. 2007. Wikify!: linking documents to encyclopedic knowledge. In Proceedings of the sixteenth ACM conference on Conference on information and knowledge management (CIKM '07). ACM, New York, N.Y., USA, 233-242; and David Milne and Ian H. Witten. 2008. Learning to link with Wikipedia. In Proceeding of the 17th ACM conference on Information and knowledge management (CIKM '08). ACM, New York, N.Y., USA, 509-518].

As the concluding step of the proposed method, a document semantic model is built (FIG. 1. 105). In the simplest case, the document semantic model is a list of all meanings of the terms. This type of model may be useful if the document contains a small number of terms, and thus all of them are important. However, larger documents require the most significant concepts to be determined The method of determining the most significant concepts consists of the following steps:

In step one, the main subject(s) of the document is (are) identified. Large documents often have one of few main subjects, as well as multiple supplementary descriptions. For instance, a document describing an event can contain not only terms that directly refer to the event but also terms describing when and where it happened. Another case where it is critical to understand the main subject is processing of noisy documents. For instance, when processing web pages, it is sometimes difficult to separate the main body from auxiliary elements such as navigation, etc.

To identify the main subject, it is proposed to group together semantically similar meanings and then identify the main group(s). To implement that idea, we build a complete weighted document semantic graph where the nodes are term meanings and the edges have weight equaling the semantic similarity between the concepts in the respective nodes. We apply a clustering algorithm to the graph. Clustering algorithms are unsupervised machine learning algorithms and provide a means to divide the graph into groups, so that there are strong links within a group and only weak links between groups.

Then each group is assigned weight. Weight may consist of a combination of several group parameters. As an example, we can use group informativeness, i.e. the sum of the informativeness values of all terms whose meanings are present in the group.

Then we select a group or several groups with the highest weight. The number of groups can be determined heuristically, e.g. by taking all groups whose weight exceeds a certain threshold or automatically, by analyzing differences between group weights. As an example, we can take all groups with weight not less than 75% of the highest weight among all the groups.

Groups thus identified contain meanings describing the main subjects of the document. We consider these meanings to be key meanings candidates.

In step two, we select key meanings from the candidate meaning. To do this, we weigh all the candidate meanings and sort by weight in descending order. We select N concepts with the highest weight as key concepts, N is found heuristically. Different parameter combinations can be used to weigh concepts. For instance, the weight can be the product of the mean number of words in all textual representations of the concept that occur as a term in the document, the frequency of concept occurrence in the document and maximum informativeness for all textual representations of the concept that occur as a term in the document.

With the previously built document semantic model with identified concepts in place, applications described above are easy to implement. For instance, for the purpose of enriching a document, we can consider the terms with key meanings as the key terms. By computing similarity between documents as semantic similarity between their models, we can build semantic search systems and semantic recommender systems.

Figure 3:
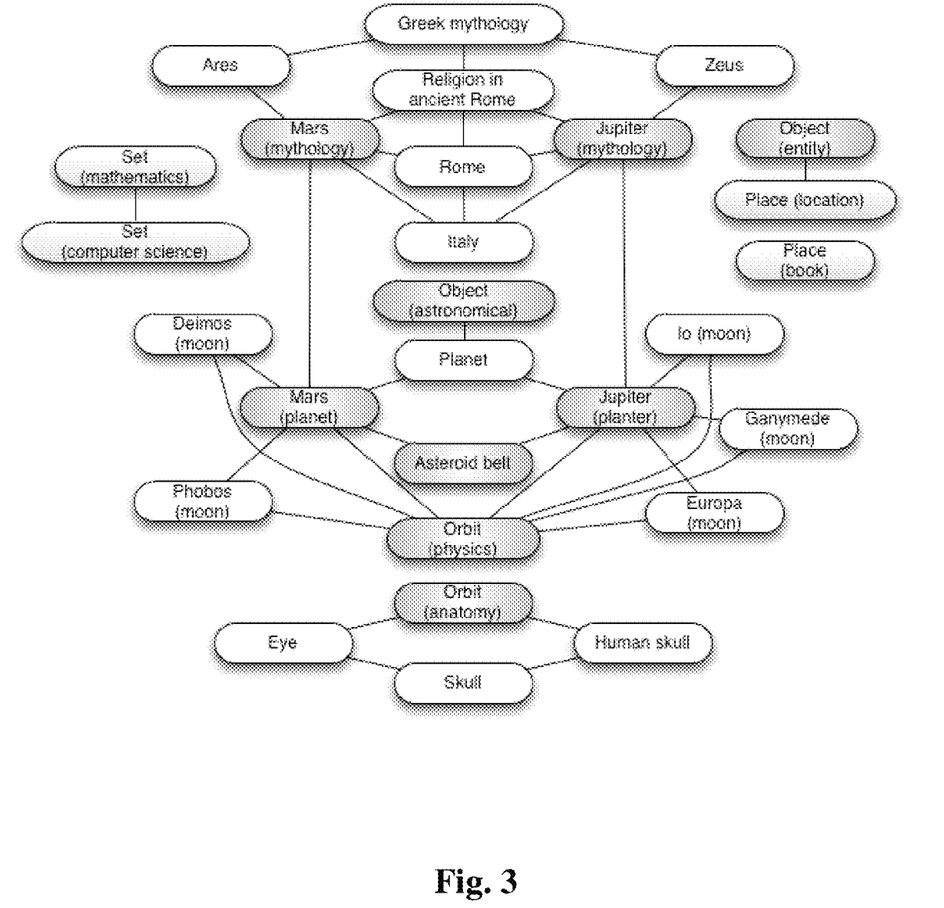
FIG. 3 shows an ontology pattern that can be used for building a semantic model of an example document consisting of one sentence: "The asteroid belt is located between the orbits of Mars and Jupiter and is the clustering place of a set of objects of all possible sizes"

We will now look at the process of building a semantic model of a document consisting of one sentence: "The asteroid belt is located between the orbits of Mars and Jupiter and is the clustering place of a set of objects of all possible sizes" and the ontology in FIG. 3.

1. Identify terms to which concepts may correspond.

Split the input text into lexemes: "The", "asteroid", "belt", "is", "located", "between", "the", "orbits", "of", "Mars", "and", "Jupiter", "and", "is", "the", "clustering", "place", "of", "a", "set", "of", "objects", "of", "all", "possible", "sizes".

Use an algorithm to find the lemma of each word: "The", "asteroid", "belt", "be", "locate", "between", "the", "orbit", "of", "Mars", "and", "Jupiter", "and", "be", "the", "cluster", "place", "of", "a", "set", "of", "object", "of", "all", "possible", "size".

Apply a greedy algorithm to search the dictionary for the terms. To do this, scan lexeme sequences containing a maximum of five words (n=5) and check these for presence in the controlled vocabulary. Each word in the vocabulary must have its normal form, so that the sequence "asteroid"+"belt" returns "asteroid belt". In this manner, find the terms "Asteroid belt", "Orbit", "Mars", "Jupiter", "Place", "Set", "Object". Note that the terms "cluster" and "size" were not found as they were absent from the ontology.

For each term, obtain a set of concepts linked to textual representations in the vocabulary: "Asteroid belt", "Orbit (physics)", "Orbit (anatomy)", "Mars (planet)", "Mars (mythology)", "Jupiter (planet)", "Jupiter (mythology)", "Place (location)", "Place (novel)", "Set (mathematics)", "Set (computer science)", "Object (entity)", "Object (astronomical)".

2. Identify the meanings of the terms. To do this, it is necessary to correlate only one possible concept to each term.

In step one, filter out terms with informativeness below a certain threshold. Threshold selection depends on the ontology. For this ontology, we select a threshold of 0.003. The informativeness values of the terms are provided in the table in FIG. 6. The terms "Set" and "Place" and their respective concepts are filtered out by the algorithm and excluded from further processing. Note that this helped us avoid an error in determining the meaning of the term "Set", as its commonly used, vaguely quantitative meaning of "many" is absent from the ontology.

In the following step, determine the meanings of the remaining terms. In the following example, we demonstrate how to use an algorithm for computing the sequence with the strongest semantic links to compute concept meanings. To do this, we need to compute the weight of each possible sequence. The weight of a sequence is computed as the sum of the weights of unique concept pairs that it includes. The weights of semantic similarity between the concepts in this example are shown in the concepts semantic similarity table in FIG. 5 (the similarity between the concepts in the table and the concepts "Orbit (anatomy)" and "Object (entity)" is zero, therefore they are not provided in the table to save space). In this example, semantic similarity is computed using Dice's measure. Similarity between the concepts is computed as the double number of common neighbors divided by the sum of all neighbors. For instance, the common neighbors of the concepts "Asteroid belt" and "Orbit (physics)" are "Mars (planet)" and "Jupiter (planet)". The concept "Asteroid belt" has three neighbors (including its link to itself), and "Orbit (physics)" has eight. Hence semantic similarity equals $$\frac{2*2}{3+8} = \frac{4}{11} \approx 0.3636.$$

Figure 5:
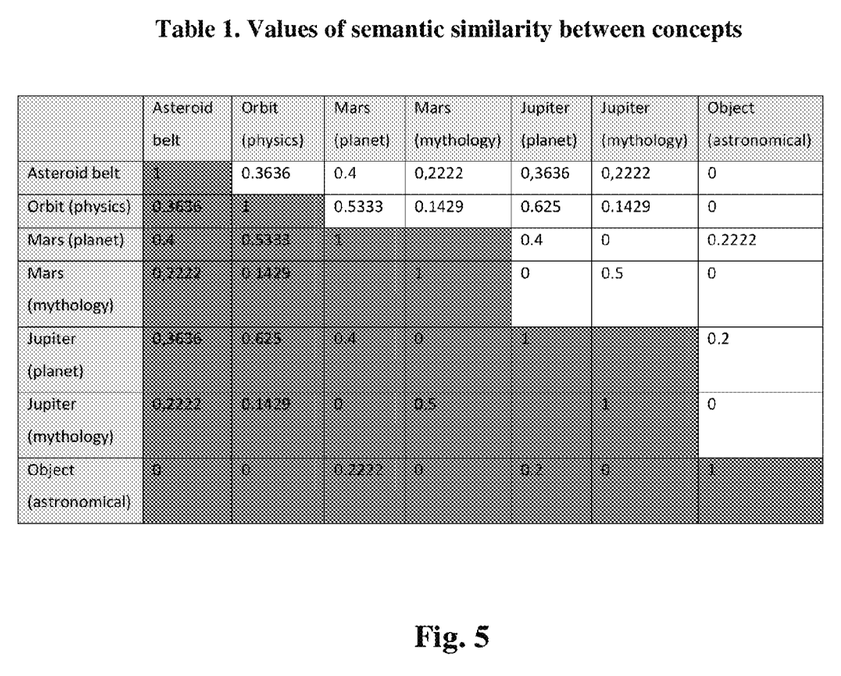
FIG. 5 shows the Concept Semantic Similarity Values Table.

Note that the table is symmetrical in relation to the diagonal, and the diagonal is occupied by ones, as the term is similar to itself with weight of 1. It is therefore sufficient to fill the top section. Besides, we will not need the similarity weights between the concepts that correspond to one term, so these do not need to be computed either.

Consider the sequence "Asteroid belt", "Orbit (physics)", "Mars (planet)", "Jupiter (planet)", "Object (astronomical)". The weight of this sequence equals $$weight_1 = 0.3636+0.4+0.3636+0+0.5333+0.635+0+0.4+0.2222+0.2=3.1177$$

For all other sequences, weight will be lower. For instance, for the sequence "Asteroid belt", "Orbit (physics)", "Mars (mythology)", "Jupiter (mythology)", "Object (astronomical)"

$$weight_2=0.3636+0.2222+0.2222+0+0.1429+0.1429+0+0.5+0=1.5938<weight_1$$

In this way we determine the term meanings.

3. In step three, build a complete weighted graph, wherein the nods are the values found in the previous step, and the weight of the edges equals the semantic similarity between the nods. Note that we computed the semantic similarity between the nods in the previous step. The semantic graph for this example is presented in FIG. 4.

Figure 4:
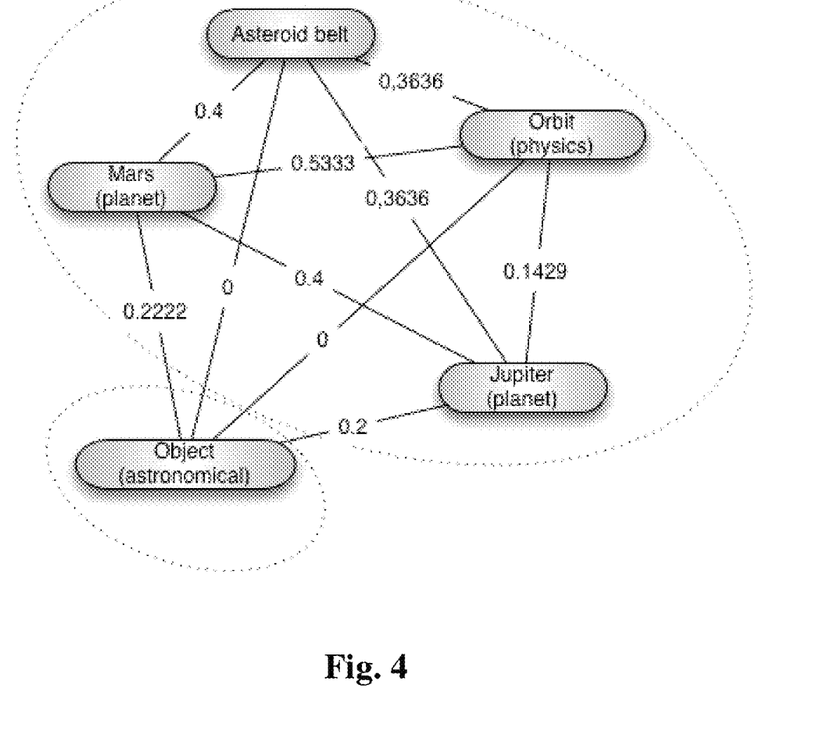
FIG. 4 shows a semantic graph of a document consisting of one sentence: "The asteroid belt is located between the orbits of Mars and Jupiter and is the clustering place of a set of objects of all possible sizes"

4. Determine the keywords for this document. To do this, use the clustering algorithm to build a candidate list. Without going into the details of how clustering algorithms work, note that all concepts, with the exception of "Object (astronomical)", have zero semantic similarity to one another. The clustering algorithm will find one cluster which contains all these concepts, and the membership of the concept "Object (astronomical)" in the cluster will depend on the algorithm used. In this example, we think of "Object (astronomical)" as belonging to another cluster. Select one cluster with the highest weight. We compute cluster weight as the sum of the informativeness values of the terms whose meanings it includes. That cluster is easily identified as the one that contains the concepts "Asteroid belt", "Orbit (physics)", "Mars (planet)", "Jupiter (planet)". Hence the candidate list will contain only these meanings.

5. Rank the concepts by importance. We determine weight as the product of the following three values:
the mean number of words in all concept textual representations that occur as a term in the document,
the frequency of concept occurrence in the document and maximum informativeness for all context textual representations that occur as a term in the document.

Figure 6:
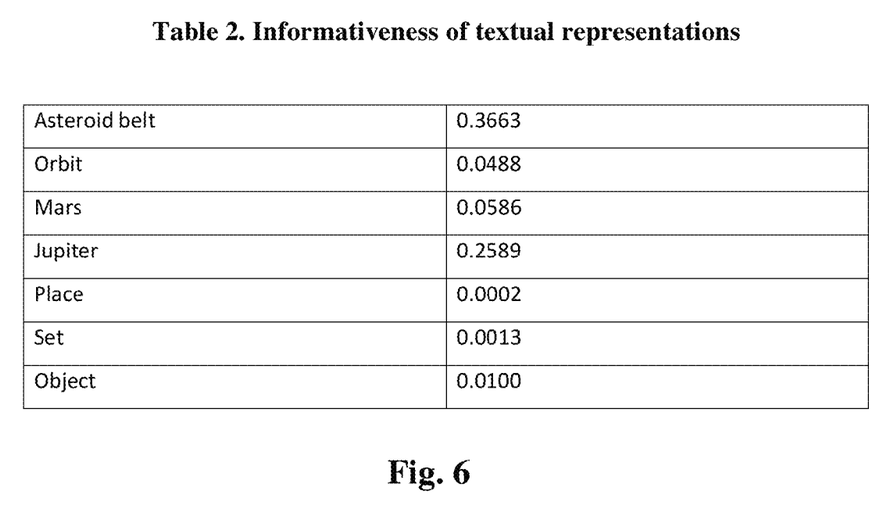
FIG. 6 shows the Textual Representations Informativeness Table.

The informativeness of the textual representations is provided in the table in FIG. 6.

Hence the concept weights in descending order are:
weight("Asteroid belt")=2*1*0.3663=0.7326
weight("Jupiter (planet)")=1*1*0.2589=0.2589
weight("Mars (planet)")=1*1*0.0586=0.0586
weight("Orbit (physics)")=1*1*0.0488=0.0488

6. The key concepts are the first n concepts, where n is set heuristically depending on the problem. Select the value in this example as n=3. Then the key concepts are "Asteroid belt", "Mars (planet)", and "Jupiter (planet)".

From this point on, keywords are easily determined in the source text. All textual representations of the key concepts, i.e. "Asteroid belt", "Mars", and "Jupiter" are considered as keywords.

Thus, the proposed method makes it easy to develop applications that assist reading by highlighting key terms or enriching the source text with hyperlinks from keywords to concept descriptions.

The possibility of applying the invention to building of semantic information retrieval systems is straightforward. If the user is enabled to point the system to the term sense that the user is looking for, the system only has to process the documents whose semantic model contains that sense. To ensure a greater scope of search, it is possible to look only for documents that contain concepts having similar meanings within the semantic model.

The invention can be applied to recommender systems by recommending documents whose semantic models are similar to the current document's model. Similarity between the models can be computed using either classical methods (normalized intersection of sets) or generalization of semantic similarity for a set of concepts as introduced in this invention.

Besides, similar techniques can be used for recommending collections of documents. In that case, a collection of documents is interpreted as a generalized document that contains semantic models of constituent documents. Consider this application using the example of blogs. Let the user be interested in messages posted in a certain blog. In order to recommend blogs whose authors write on semantically similar subjects, it is necessary to compare the messages in the blogs and find the ones with the highest similarity. Applying the proposed method, we can think of the blog as a generalized document with a semantic model composed of all message models. Then we can obtain blog recommendations by applying the method to a document recommendation process.

It is possible to create brief descriptions of documents, too. These can consist of key terms or sentences and paragraphs that contain key terms. Alternatively, more complex automatic annotation and abstraction techniques can be applied. In that case, knowledge about key terms and their meanings is used as the features.

What is claimed is:

1. A method of building a semantic model of a document, comprising:
extracting an ontology comprising concepts from information sources, the information resources comprising electronic resources with hyperlinked or not hyperlinked descriptions of real-world objects;
assigning each concept in the ontology an identifier that unambiguously identifies each concept;
transforming hyperlinks between concept descriptions into links between concepts, if hyperlinks between concept descriptions are already present;
adding hyperlinks by analyzing the descriptions and inducing term senses from ontologies extracted from hypertext encyclopedias if no hyperlink structure is initially present;
transforming hyperlinks into links between concepts;
saving an URL of an original concept description;
setting at least one textual representation for each concept;
computing a frequency of co-occurrence and informativeness for each textual representation of the concept;
identifying a natural language of the textual representation;
saving obtained information;
searching the document to be analyzed for terms and their possible senses by correlating parts of the document's text with textual representations of concepts from a controlled vocabulary;
selecting, for each term, one sense from a range of possible senses using a word-sense disambiguation algorithm and considering this sense to be the term's meaning; wherein the word-sense disambiguation algorithm is an algorithm based on supervised machine learning, wherein a feature vector is computed for each term, and the most suitable sense is identified from that vector; and wherein a usage probability of term t in given sense $m_i$, computed as $$P_t(m_i) = \frac{c(t, m_i)}{\sum_i c(t, m_i)},$$

where $c(t, m_i)$ is the frequency of co-occurrence of term t in sense $m_i$, is used as the feature;
ranking concepts that correspond to term senses by importance to the text; and
building the semantic model of the document by determining highest ranked concepts.

2. The method of claim 1, wherein the word-sense disambiguation algorithm is an algorithm that selects the most frequently used sense by determining the frequency of co-occurrence of the term with all related concepts, and selecting a concept with the highest co-occurrence frequency as the term's meaning.

3. The method of claim 1, wherein the word-sense disambiguation algorithm is an algorithm that computes the sequence of senses with the highest semantic similarity by examining all sequences of concept senses for a given term sequence, computing the weight of each concept sequence as a sum of the weights of unique concept pairs included in the concept sequence, and considering sequences having the highest weight as the term meanings.

4. The method of claim 1, wherein the term's informativeness is selected as the feature.

5. The method of claim 1, wherein the semantic similarity between the concept and the context of the document is used as the feature.

6. The method of claim 5, wherein the senses of monosemantic terms are selected as the document's context.

7. The method of claim 1, wherein the sum of the informativeness values of each monosemantic term and the semantic similarity of its meaning to all other concepts from the document's context is used as the feature.

8. The method of claim 1, wherein the link structure of the information source with no hyperlinks initially present is determined by:
   extracting an ontology from a hypertext encyclopedia;
   enriching the concept descriptions in the information source with no hyperlinks initially present with links to the existing ontology extracted from the hypertext encyclopedia; extending the controlled vocabulary of the existing ontology by textual representations of all concepts from the information source with no hyperlinks;
   setting the co-occurrence frequency of said concepts and their textual representations to 1 for each unique representation-concept pair;
   repeating the enriching operation for concepts in the information source being processed by using informativeness computed through an inverse document frequency;
   producing additional links between the concepts that are extracted from the information source with no hyperlinks, and
   updating the co-occurrence frequency of the textual representation and the using the previously obtained links.

9. The method of claim 1, wherein the ranking of the concepts by importance to the document is implemented by:
   building the document's semantic graph, the semantic graph comprises the senses of all terms from the documents and all weighted links between these terms, wherein a link weight equals the semantic similarity between the concepts connected by that link;
   applying a clustering algorithm to the semantic graph to group the concepts which are semantically similar;
   ranking the concepts from the most important clusters by importance to the document, and
   considering the most important concepts as the semantic model of the document.

10. The method of claim 1, wherein extracting the ontology comprises:
    computing a semantic similarity between the concepts, wherein for each concept K a concept list C is built, composed of concepts $c_i$ referenced by concept K or referencing concept K;
    computing a semantic similarity of current concept K to each concept $c_i \in C$; saving a semantic similarity between each pair of concepts K and $c_i$, along with corresponding concepts K and $c_i$; and
    for concepts not on list C, setting their semantic similarity to concept K as zero.

11. The method of claim 10, wherein links between the concepts are assigned weights, a threshold weight is set, and concept list C is built from concepts either referenced by concept K with a link exceeding the previously selected threshold value, or from the concepts referencing concept K with a link exceeding that threshold.

12. The method of claim 1, wherein the ontologies are extracted from several sources.

13. The method of claim 1, wherein document metadata are used as the document's text.

* * * * *